(12) United States Patent
Djernaes et al.

(10) Patent No.: US 7,590,119 B2
(45) Date of Patent: Sep. 15, 2009

(54) METHOD AND APPARATUS FOR CONTEXT-BASED PREFIX UPDATES IN BORDER GATEWAY PROTOCOL

(75) Inventors: Martin Djernaes, Dublin, CA (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 759 days.

(21) Appl. No.: 11/091,316

(22) Filed: Mar. 14, 2005

(65) Prior Publication Data

US 2006/0164995 A1 Jul. 27, 2006

Related U.S. Application Data

(60) Provisional application No. 60/647,978, filed on Jan. 27, 2005.

(51) Int. Cl.
*H04L 12/28* (2006.01)
*H04L 12/56* (2006.01)
*G06F 15/16* (2006.01)

(52) U.S. Cl. .................. 370/392; 370/395.31; 709/228

(58) Field of Classification Search ................. 370/238, 370/395.2, 395.21, 395.31, 389, 392, 401; 709/227–229, 238, 242, 245
See application file for complete search history.

(56) References Cited

U.S. PATENT DOCUMENTS

| | | | |
|---|---|---|---|
| 6,078,957 A | 6/2000 | Adelman et al. | |
| 6,850,492 B2 * | 2/2005 | Chander et al. | 370/235 |
| 6,938,095 B2 * | 8/2005 | Basturk et al. | 709/238 |
| 7,031,320 B2 * | 4/2006 | Choe | 370/395.31 |
| 7,099,323 B1 * | 8/2006 | Doong et al. | 370/390 |
| 7,418,519 B1 * | 8/2008 | Chavali | 709/242 |
| 7,423,981 B2 * | 9/2008 | Brown | 370/256 |
| 7,430,176 B2 * | 9/2008 | Nalawade et al. | 370/238 |
| 7,447,167 B2 * | 11/2008 | Nadeau et al. | 370/254 |
| 2001/0049731 A1 | 12/2001 | Kuusinen et al. | |
| 2002/0141343 A1 * | 10/2002 | Bays | 370/235 |
| 2003/0079027 A1 * | 4/2003 | Slocombe et al. | 709/229 |
| 2004/0076149 A1 * | 4/2004 | Parent et al. | 370/389 |
| 2004/0090913 A1 | 5/2004 | Scudder et al. | |
| 2004/0196827 A1 | 10/2004 | Xu et al. | |
| 2005/0089015 A1 * | 4/2005 | Tsuge et al. | 370/351 |
| 2005/0135256 A1 * | 6/2005 | Ball et al. | 370/238 |

(Continued)

OTHER PUBLICATIONS

Y. Rekhter, et al., "A Border Gateway Protocol 4 (BGP-4)", Network Working Group Internet Draft, Obsoletes: Request for Comments: 1771, Oct. 2004.

(Continued)

*Primary Examiner*—Chi H Pham
*Assistant Examiner*—Warner Wong
(74) *Attorney, Agent, or Firm*—Hickman Palermo Truong & Becker LLP

(57) ABSTRACT

A method is disclosed for providing context-based routing table updates in Border Gateway Protocol (BGP) hosts. One or more contexts representing distinct routing tables are defined in a BGP host. As part of establishing a BGP session, a particular context of the one or more contexts is advertised to the BGP peer. In response to receiving from the BGP peer a route update message that includes information identifying the particular context, the routing table that is represented by the particular context is updated at the BGP host.

48 Claims, 7 Drawing Sheets

U.S. PATENT DOCUMENTS

| | | | |
|---|---|---|---|
| 2005/0135369 A1* | 6/2005 | Galand et al. | 370/392 |
| 2005/0177634 A1* | 8/2005 | Scudder et al. | 709/225 |
| 2005/0213498 A1 | 9/2005 | Appanna et al. | |
| 2006/0087977 A1* | 4/2006 | Tatman | 370/242 |
| 2006/0133390 A1* | 6/2006 | Sreekantiah et al. | 370/401 |
| 2006/0140136 A1* | 6/2006 | Filsfils et al. | 370/255 |
| 2006/0140185 A1* | 6/2006 | Norman et al. | 370/389 |

OTHER PUBLICATIONS

Y. Rekhter, et al., "A Border Gateway Protocol 4 (BGP-4)", Network Working Group Request for Comments: 1771, Mar. 1995.

T. Bates, et al., "Multiprotocol Extensions for BGP-4", Network Working Group Request for Comments: 2858, Jun. 2000.

R. Chandra, et al., "Capabilities Advertisement with BGP-4", Network Working Group Request for Comments: 3392, Nov. 2002.

International Searching Authority, "Notification of Transmittal of the International Search and the Written Opinion of the International Searching Authority, or the Declaration," PCT/US06/02009, dated Jun. 13, 2006, 8 pages.

Claims, PCT/US06/02009, 8 pages.

International Searching Authority, "Notification of Transmittal of the International Search Report and the Written Opinion of the International Searching Authority, or the Declaration", International application No. PCT/US06/39099, dated Sep. 25, 2007, 8 pages.

Claims, , International application No. PCT/US06/39099, 5 pages.

* cited by examiner

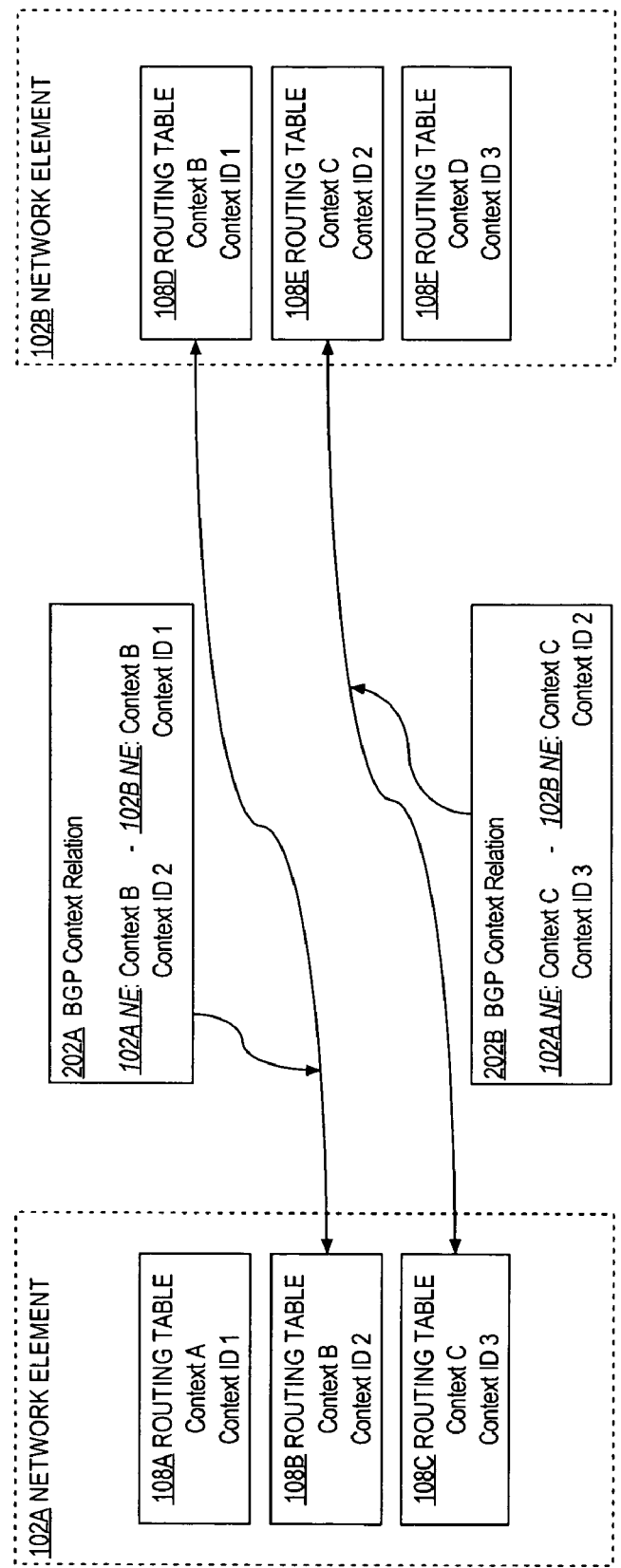

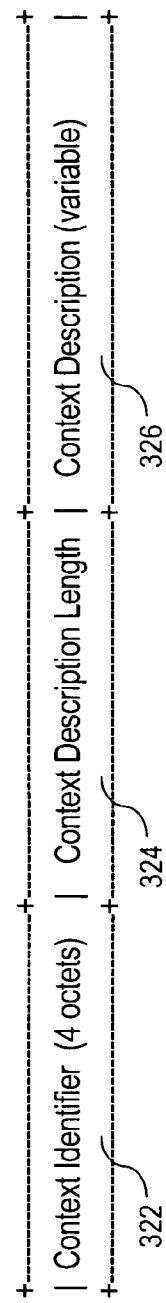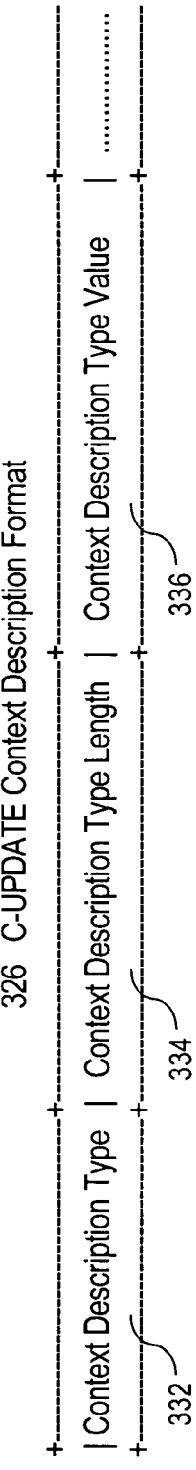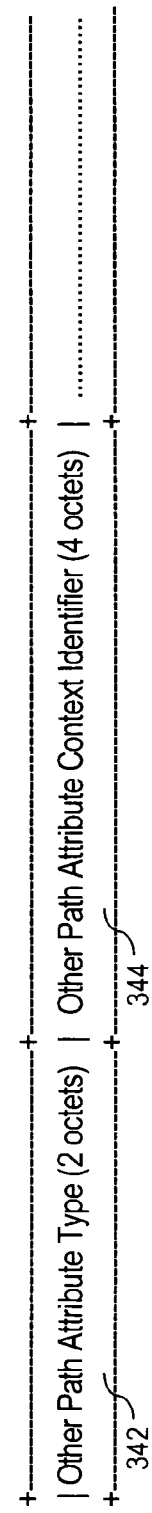
Fig. 3B
Fig. 3C
Fig. 3D

METHOD AND APPARATUS FOR CONTEXT-BASED PREFIX UPDATES IN BORDER GATEWAY PROTOCOL

CROSS-REFERENCE TO RELATED APPLICATIONS; PRIORITY CLAIM

This application claims domestic priority under 35 U.S.C. 119(e) from prior provisional application Ser. No. 60/647,978 filed Jan. 27, 2005, of Martin Djernaes et al., entitled "Method and Apparatus for Context-Based Prefix Updates in Border Gateway Protocol," the entire contents of which is hereby incorporated by reference as if fully set forth herein.

FIELD OF THE INVENTION

The present invention generally relates to network routing. The invention relates more specifically to providing context-based prefix updates in Border Gateway Protocol (BGP).

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for inter-Autonomous System routing. The function of a BGP-enabled network element (a BGP host or peer) is to exchange network reachability information with other BGP-enabled network elements. The most commonly implemented version of BGP is BGP-4, which is defined in RFC1771 (published by the Internet Engineering Task Force (IETF) in March 1995).

To exchange routing information, two BGP hosts first establish a peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is defined as a unit of information that pairs a network destination with the attributes of a network path to that destination. The attributes of the network path include, among other things, the network addresses (also referred to as address prefixes or just prefixes) of the computer systems along the path. In a BGP host, the routes are stored in a Routing Information Base (RIB). Depending on the particular software implementation of BGP, a RIB may be represented by one or more routing tables. When more than one routing table represents a RIB, the routing tables may be logical subsets of information stored in the same physical storage space, or the routing tables may be stored in physically separate storage spaces.

As defined in RFC1771, the structure of a BGP UPDATE message accommodates updates only to Internet Protocol version 4 (IPv4) unicast routes. The Multiprotocol Extension for BGP defined in RFC2858 (published by IETF in June 2000) accommodates updates to routing information for multiple Network Layer protocols, such as, for example, Internet Protocol version 6 (IPv6), Internetwork Packet eXchange (IPX), Appletalk, Banyan Vines, Asynchronous Transfer Mode (ATM), X.25, and Frame Relay. RFC2858 introduced two single-value parameters to accommodate the changes to the BGP UPDATE message structure: the Address Family Identifier (AFI) and the Subsequent Address Family Identifier (SAFI).

The AFI parameter carries the identity of the network layer protocol associated with the network address that follows next in the path to the destination. The SAFI parameter provides additional information about the type of the Network Layer Reachability Information that is included in a BGP UPDATE message, and the values defined for this parameter usually indicate a type of communication forwarding mechanism, such as, for example, unicast or multicast. While some of the AFI and SAFI values are reserved for private use, the AFI and SAFI values that can be commonly used by the public must be assigned through the Internet Assigned Numbers Authority (LANA). The AFI/SAFI combination is used by the software implementations of BGP to indicate the type of the BGP prefix updates, what format the prefix updates have, and how to interpret the routes included in the BGP UPDATE messages.

However, the AFI/SAFI hierarchy is a tight structure that cannot be easily modified to accommodate changes. If a new type of addresses, which does not conform to the current hierarchy of a major family address and a subsequent family address, is ever needed, there is no good way to convey updates to routes that include addresses conforming to such new type of addresses because the new type of addresses may not be adequately describable by using only AFI and/or SAFI values.

For example, with the proliferation of different types of network traffic, such as streaming video and voice-over-IP, there may be different types of addresses in a network that belong to the same address family. A network may carry audio, video, and regular data traffic in an IPv4 address network. In this case, it is desirable to store network routes for the different types of traffic in separate routing tables to achieve faster route updating. However, since the different routes are represented by the same address family (such as, for example, an AFI/SAFI combination indicating IPv4 unicast), current implementations of BGP cannot distinguish among these routes, and will have to put them in the same routing table. Thus, the AFI/SAFI combination proves inadequate at least to differentiate between routes that carry different types of network traffic.

One past approach that accommodated a new address family in a BGP implementation was assigning of a new SAFI value for identifying Virtual Private Network (VPN) addresses. In this approach, the implementation of BGP was also modified to specifically deal with the prefixes conveyed by a BGP UPDATE message for updates to routes that included VPN addresses.

However, this approach has several disadvantages. One problem is that upon receiving a BGP UPDATE message, the whole route must be extracted from the message before it can be determined to which routing table the updates would go. Another problem with using this approach to accommodate a new address family is that formal changes to the software implementation of BGP and to the BGP UPDATE message structure are needed every time a new address family is defined by assigning a new AFI and/or SAFI value.

Another problem with updating routes in BGP by using the AFI/SAFI hierarchy is that currently BGP does not support sending an IPv6 address prefix in a NEXT_HOP PATH attribute that is included in a BGP UPDATE message for an IPv4 route. Currently, BGP defaults the NEXT_HOP attribute values to the same address family to which the BGP UPDATE message is targeted. The reason is that a 16-byte IPv6 address cannot be stored in a 4-byte IPv4 address space, and consequently, BGP cannot be used to provide route updates for IPv4 routes in which the next hop in the route is an address in a "pure" IPv6 network.

Based on the foregoing, there is a clear need for techniques providing routing table updates in BGP for routes including addresses from newly-defined address types or address families, while not requiring any modifications to the software implementation of BGP itself. Further, there is a clear need to provide in BGP updates to IPv4 routes for which the next hop in the route is an address in an IPv6 network.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that illustrates an example of the relations between BGP contexts defined on two BGP peers according to an embodiment;

FIG. 3B is a block diagram that illustrates the format of a context-based Capability Value field of a BGP CAPABILITIES parameter according to an embodiment;

FIG. 3C is a block diagram that illustrates the format of a Context Description field in a context-based Capability Value field according to an embodiment;

FIG. 3D is a block diagram that illustrates the format of a context-indicating PATH attribute value field according to one embodiment;

DETAILED DESCRIPTION

Figure 1:
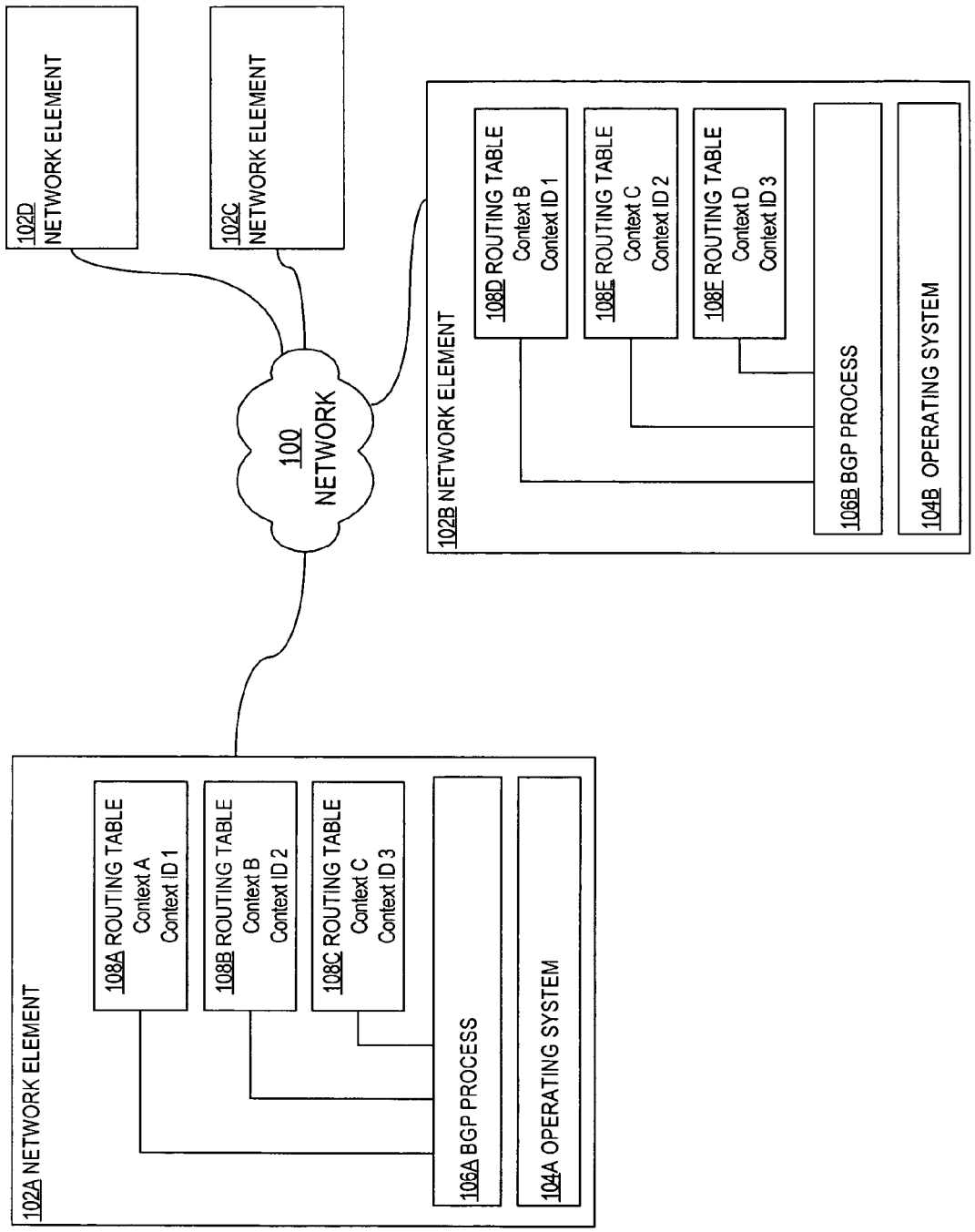
FIG. 1 is a block diagram that illustrates an overview of network elements upon which an embodiment may be implemented.

A method and apparatus for providing routing table updates in Border Gateway Protocol (BGP) is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Structural Features of an Embodiment
   3.1 Contexts and Context Identifiers
   3.2 BGP Context-Based UPDATE Message Format
   3.3 BGP Context Description Format
   3.4 BGP Context-Related PATH Attribute Format
4.0 Method of Providing Routing Table Updates in BGP
   4.1 Process of Context-Based Prefix Updating
   4.2 Process of Context-Based Next-Hop Routing
5.0 CONTEXT Capability Approach for Advertising and Updating Contexts
6.0 Implementation Mechanisms—Hardware Overview
7.0 Extensions and Alternatives

1.0 General Overview

The needs identified in the foregoing Background, and other needs and objects that will become apparent for the following description, are achieved in the present invention, which comprises, in one aspect, a method for providing context-based routing table updates in Border Gateway Protocol (BGP) hosts. One or more contexts representing distinct routing tables are defined in a BGP host. As part of establishing a BGP session with a BGP peer, the BGP host advertises a particular context of the contexts to the BGP peer. In response to receiving from the BGP peer a route update message that includes information identifying the particular context, the BGP host updates the routing table that is represented by the particular context.

In one feature of the aspect, each distinct routing table stores a set of routes having address prefixes belonging to the same address family. In another feature of the aspect, each distinct routing table stores a set of routes having address prefixes that belong to different address families.

In one feature of this aspect, a set of routes is stored in each distinct routing table, where each set of routes is used for routing packets that carry a specific type of information. In this feature, the specific type of information can be at least one of video, audio, or data information.

In a feature of the aspect, each of the one or more contexts is associated with a unique context identifier and a unique context description. As part of advertising a particular context, the context identifier and the context description associated with the particular context are sent to the BGP peer. The BGP peer then includes the context identifier associated with the particular context in the information sent in the route update message to the BGP host.

In one feature of this aspect, the context identifier and the context description associated with a particular context are advertised to the BGP peer in a BGP CAPABILITIES parameter that is included in a BGP OPEN message sent to the BGP peer as part of establishing the BGP session.

In a feature of the aspect, the route update message received from the BGP peer is a BGP UPDATE message.

In one feature of this aspect, the route update message includes a context attribute, where the context attribute is a first BGP PATH attribute. The value of the first context attribute associates a second BGP PATH attribute with a context identifier of a context in the BGP host, where the context is different than the context indicated in the route update message. In one embodiment, the second BGP PATH attribute is a NEXT_HOP PATH attribute.

In one feature of this aspect, updating the routing table at the BGP host includes extracting the value of the context identifier from the route update message. The rest of the information in the route update message is extracted only if the value of the context identifier matches any context identifier associated with a context in the BGP host.

In a feature of the aspect, the context description associated with a context is based on an Address Family Identifier (AFI) that identifies a type of network address or on a Subsequent Address Family Identifier (SAFI) that identifies a type of communication forwarding mechanism. In another feature of the aspect, the context description is based on both an AFI and a SAFI.

In one feature of this aspect, the associations between the contexts and their corresponding context identifiers are destroyed upon the closing of the BGP session in which the context identifiers were advertised. In a different feature, the associations between the contexts and their corresponding context identifiers persist and are preserved across different BGP sessions.

In a feature of the aspect, the BGP peer sends to the BGP host route update messages for updating only routing tables that are represented by contexts that have been advertised by the BGP host as part of establishing the BGP session.

In another aspect, the invention encompasses a computer apparatus configured to carry out the steps described above. In a feature of this aspect, the computer apparatus is a router. In a different aspect, the invention encompasses a computer-readable medium configured to carry out the foregoing steps.

2.0 Structural and Functional Overview

In one embodiment, a BGP UPDATE message is assembled according to a format that does not provide for any address family information, such as AFI and/or SAFI. Instead, the BGP UPDATE message includes a context identifier that identifies a particular context that was advertised and negotiated by the BGP peers during the establishing of the BGP session. Thus, the AFI/SAFI hierarchy is decoupled from the BGP UPDATE message, and any address family hierarchy or description of a context representing a particular routing table is instead defined in a BGP CAPABILITIES parameter that is included in a BGP OPEN message that establishes the BGP session between the BGP peers. A subsequent BGP UPDATE message includes only an identifier of the context along with the updates to the address prefixes for a route stored in the particular routing table.

In operation, a BGP host that supports the above BGP UPDATE message format assigns a unique context identifier to each routing table for which it wants to exchange network reachability information. During the establishment of a BGP session with a BGP peer, the BGP host informs the peer about the values of the context identifiers and context descriptions associated with the routing tables. When the BGP host receives a BGP UPDATE message tagged with a particular context identifier, the BGP host can determine the routing table that must be updated based on the particular context identifier.

Figure 4:
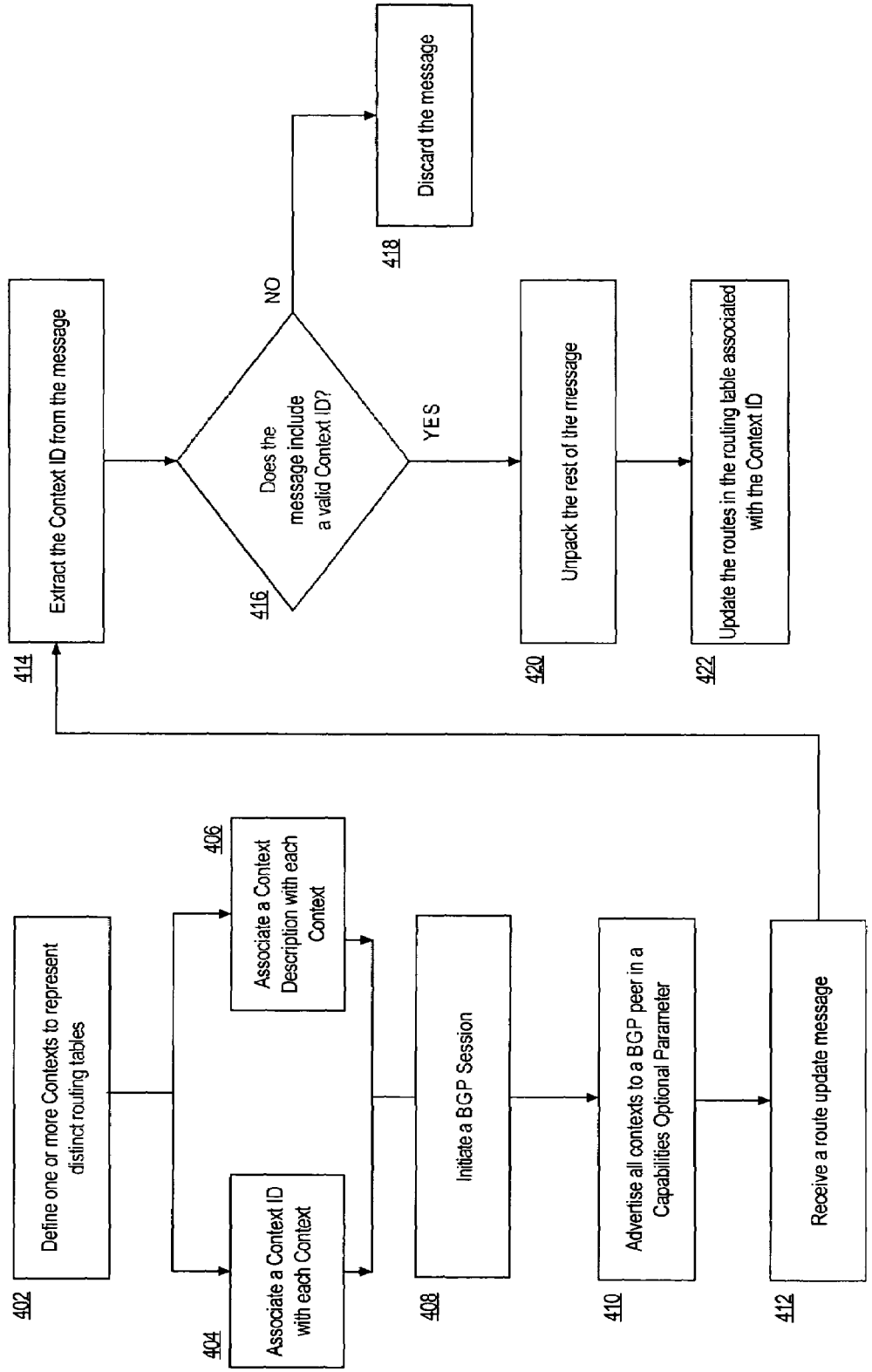
FIG. 4 is a flow diagram that illustrates an overview of one embodiment of a method for providing routing table updates in BGP.

FIG. 4 is a flow diagram that illustrates an overview of one embodiment of a method for providing routing table updates in BGP. In step 402, a BGP host defines one or more contexts to represent distinct routing tables. In step 404, a context ID (or a context identifier) is associated with each context. In addition, step 406 may be performed, in which a context description is associated with each context.

The BGP host initiates a BGP session with a BGP peer in step 408. As part of establishing the session, in step 410 the BGP host advertises all defined contexts to the peer. The BGP may perform this step by including the context identifiers and the context descriptions for each context in a CAPABILITIES parameter of a BGP OPEN message, or by any other BGP communication techniques now known or later developed.

In step 412, the BGP host receives from the BGP peer a route update message that includes a context ID that the BGP host has previously advertised to the peer. In one embodiment, the route update message is BGP UPDATE message that conforms to a format that includes a field for storing the context ID. In step 414, the BGP host extracts the context ID from the message, and in step 416 it is determined whether the extracted context ID matches any of the BGP host's context IDs that are associated with a context.

If the extracted context ID does not match a valid context ID of the BGP host, then in step 418 the BGP host discards the message. In a different embodiment, the BGP process running on the host may be backward compatible and may support the conventional BGP method for updating routes. In this embodiment, instead of discarding the message, in step 418 the BGP process on the host processes the message in the conventional way.

If in step 416 it is determined that the extracted context ID matches a valid context ID of the BGP host, in step 420 the message is unpacked. Next, in step 422 the route updates included in the message are applied to a route in the routing table that is associated with the context ID extracted from the message.

3.0 Structural Features of an Embodiment

3.1 Contexts and Context Identifiers

In one embodiment, a context identifier is defined as a four-octet value and is associated with a context that represents a distinct routing table. In this embodiment, context identifiers are assigned in sequential order starting with "1", and the values of the context identifiers are only significant to the BGP session for which they are defined. In a different embodiment, a BGP host may preserve the context identifiers assigned to particular contexts even after a BGP session is closed. In this way, the associations between context identifiers and contexts persist, and the BGP host may use the same context identifiers to identify the same contexts in a different BGP session or sessions that may be established with the same or a different BGP peer.

In different embodiments, the context identifier can be a value of any size and data type that can uniquely identify a distinct routing table. Furthermore, since the context identifiers are negotiated between BGP peers participating in a particular BGP session, the context identifiers can be values of a type and size that is meaningful only to the participants in the particular BGP session. Also, a BGP host may chose to assign context identifiers to contexts in any manner so long as the BGP host and its peer are able to uniquely identify a context and its associated routing table through a context identifier.

A context represents a set of routes that are stored in a routing table. Thus, a context can be defined to represent any group of routes that can be stored in a routing table that may be a logical subset of information in a RIB or a physically separate table. A context may represent any number of address families including, but not limited to, IPv4, IPv6, Appletalk, Banyan Vines, IPX, Decnet IV, Switched Multi-megabit Data Services (SMDS), Frame Relay, ATM, High-level Data Link Control (HDLC), Network Service Access Point (NSAP), Domain Name Service (DNS), Autonomous System (AS) Number, Xpress Transport Protocol (XTP) over IPv4, XTP over IPv6, and native mode XTP. In addition, a context may represent routing tables that store routes having prefixes of the same address family but used for routing a particular type of packets, such as audio, video, and data packets. For example, separate contexts may be defined to represent IPv4 unicast routes for routing streaming video, voice-over-IP, and regular data packets.

Furthermore, as mentioned above, a BGP UPDATE message longer includes any information to identify the type and/or the address family of the address prefixes it carries, but instead the type and/or the address family of the address prefixes are associated with a context that is negotiated as part of establishing a BGP session.

In the context of VPN routing, for example, instead of tagging the address prefixes of a route with a VPN tag, a BGP host can define a context and a context identifier to represent a set of VPN routes, which routes share the same VPN tag and are stored in a particular routing table. The BGP host then advertises the VPN context identifier to a BGP peer during the establishing of a BGP session. When a BGP UPDATE message that includes the VPN context identifier is received, the BGP host will know that it needs to update the particular routing table without the need to extract all the address prefixes from the message in order to decide to which routing table to apply the updates.

3.2 BGP Context-Based UPDATE Message Format

Figure 3A:
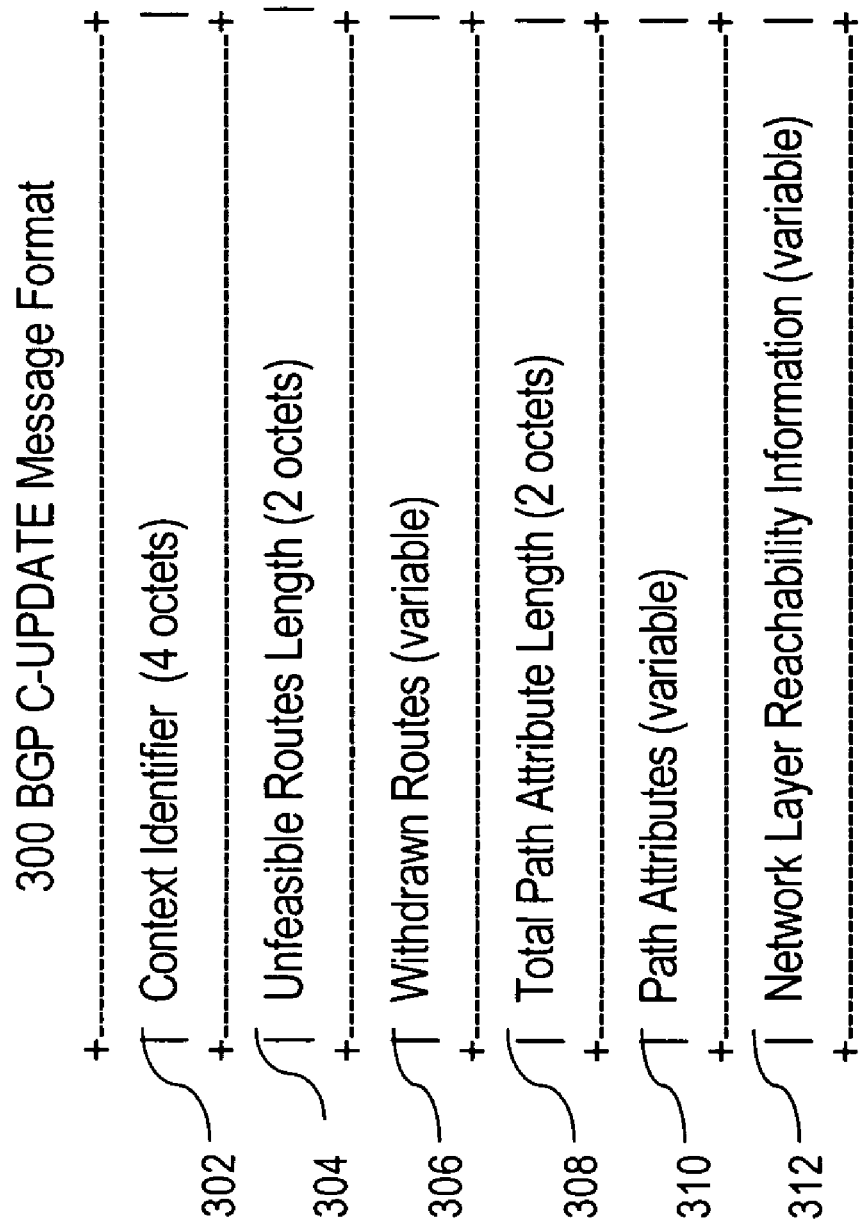
FIG. 3A is a block diagram that illustrates the format of a BGP UPDATE Message according to an embodiment.

In an embodiment, a BGP UPDATE message is defined and used in a BGP process. FIG. 3A is a block diagram that illustrates an example format of such message, which is denoted in the figure as BGP C-UPDATE Message 300. As shown in FIG. 3A, the format includes Context Identifier field 302 to hold the value of a context identifier that is associated with a context representing a routing table.

The rest of the fields shown in FIG. 3A, Unfeasible Routes Length 304, Withdrawn Routes 306, Total Path Attribute Length 308, Path Attributes 310, and Network Layer Reachability Information 312 are the same as the fields defined for BGP UPDATE messages in RFC1771. Namely, Unfeasible Routes Length field 304 stores the length of Withdrawn Routes field 306 in a particular message. Withdrawn Routes field 306 stores a list of address prefixes for the routes that are being withdrawn from service, where each address prefix is encoded as a tuple of the form <length, prefix>. Total Path Attribute Length field 308 stores the length of Path Attributes field 310 in the message. Path Attributes field 310 stores a number of predefined PATH attributes in a variable-length triple of <attribute type, attribute length, attribute value>. Network Layer Reachability Information field 312 stores a list of one or more address prefixes for the route that is advertised by the particular BGP UPDATE message. The information in the list is stored as a <length, prefix> tuple, where <length> is the length in bits of the address prefix that follows in the tuple.

3.3 BGP Context Description Format

In one embodiment, a context-based CAPABILITIES parameter value is defined to enable a BGP process to advertise that it can perform context-based updates. The CAPABILITIES parameter value is defined according to the standards set forth in RFC3392, which was published by the IETF in November 2002. RFC3392 defines the CAPABILITIES parameter in order to facilitate the introduction of new capabilities in BGP by providing graceful capability advertisement without requiring that BGP peering be terminated. A CAPABILITIES parameter with one or more capabilities of a BGP host is sent in a BGP OPEN message in order notify a BGP peer of the capabilities supported by the BGP host.

As defined in RFC3392, a CAPABILITIES parameter contains one or more triples <Capability Code, Capability Length, Capability Value>, where Capability Code is a one octet field that unambiguously identifies individual capabilities, Capability Length is a one octet field that contains the length of the Capability Value field in octets, and Capability Value is a variable length field that is interpreted according to the value of the Capability Code field.

FIG. 3B is a block diagram that illustrates the format of a context-based C-UPDATE Capability Value field 320 of a BGP CAPABILITIES parameter according to an embodiment. In FIG. 3B, C-UPDATE Capability Value field 320 is an array of Type-Length-Value (TLV) elements, where each element is a triple of <Context Identifier, Length, Context Description>. In each element, Context Identifier field 322 stores a context identifier value as described above, and Context Description Length field 324 is the length of Context Description field 326.

Context Description field 326 is an array of TLV elements. FIG. 3C is a block diagram that illustrates the format of C-UPDATE Context Description field 326 in context-based Capability Value field 320 according to an embodiment. In FIG. 3C, C-UPDATE Context Description field 326 includes Context Description Type field 332, Context Description Type Length field 334, and Context Description Type Value field 336.

Context Description Type field 332 stores the type of the context. For example, in an embodiment, Context Description Type field 332 stores a valid AFI value to identify a particular address family, or may store a valid SAFI value to identify a subsequent address family. In addition, in a different embodiment Context Description Type field 332 may store the value of any address family type that is defined by IANA, or any value that may be pre-negotiated for a meaning that is understood only by the BGP peers in a BGP session, such as, for example, a context identifier as described above.

Context Description Type Length field 334 stores the length of Context Description Type Value field 336. Context Description Type Value field 336 stores the value that is associated with the context description type identified in Context Description Type field 332.

3.4 BGP Context-Indicating PATH Attribute Format

In one embodiment, a particular PATH attribute in a BGP UPDATE message may apply to a context that is different than the context identified by the context identifier stored in the Context Identifier field of the message. An example of such attribute is the NEXT_HOP PATH attribute, which indicates the address prefix of the next hop in the route for which a BGP UPDATE message is received by a BGP host. In other words, the BGP message may contain updates to a route in which the next hop in the route is an address prefix in a network that supports addresses from a different address family.

In order to support the above scenario, in one embodiment a CONTEXT PATH attribute is introduced. The CONTEXT PATH attribute is a special PATH attribute, which is used as a holder for storing other PATH attributes.

As defined in RFC1771, a PATH attribute is a variable-length list of elements, in which each element is a TLV triple <Attribute Type, Attribute Length, Attribute Value>. According to one embodiment, the CONTEXT PATH attribute is a PATH attribute defined according to the above format, where the Attribute Type field stores an attribute code for the CONTEXT PATH attribute, and the Attribute Length field stores the length of the Attribute Value field.

FIG. 3D is a block diagram that illustrates the format of a CONTEXT PATH Attribute Value field according to this embodiment. CONTEXT PATH Attribute Value field 340 stores a variable-length list of elements, where each element is a tuple <Other Path Attribute Type, Other Path Attribute Context Identifier>. In a particular BGP UPDATE message, Other Path Attribute Type field 342 stores the attribute type of another PATH attribute that is included in the message, and Other Path Attribute Context Identifier field 344 stores the context identifier of the context to which the other path attribute pertains.

For example, presume that the NEXT_HOP PATH attribute has an attribute type value of "3", and that the CONTEXT PATH attribute has an attribute type value of "61". Further presume that a BGP host receives a BGP UPDATE message with a Context Identifier field that contains the value of "1" (indicating that the prefix updates included in the message pertain to a route in the routing table represented by context "1"), and that the message further includes the value of a NEXT_HOP PATH attribute that pertains to a context associated with a context identifier of "5". In this scenario, the BGP UPDATE message will include a CONTEXT PATH attribute comprising the values <61, 2, 3:5>, where "61" is the attribute type of the CONTEXT PATH attribute, "2" is the length in bytes of the CONTEXT PATH attribute value, and "3:5" indicates that the PATH attribute of type "3" included in the BGP UPDATE message pertains to the context identified by context identifier "5" in the BGP host.

4.0 Method of Providing Routing Table Updates in BGP 4.1 Process of Context-Based Prefix Updating FIG. 1 is a block diagram that illustrates an overview of network elements upon which one embodiment may be implemented. BGP-enabled network elements 102A, 102B, 102C, and 102D are communicatively connected to network 100. Although FIG. 1 depicts only four network elements, other embodiments can be implemented by any number of network elements that are connected to a network.

In FIG. 1, network element 102A includes operating system 104A and BGP process 106A, which executes on top of the operating system. BGP process 106A maintains a set of routing tables, examples of which are routing tables 108A, 108B, and 108C. As depicted in FIG. 1, routing table 108A stores routes described as "Context A" and is assigned a context ID of "1". Similarly, routing table 108B stores routes described as "Context B" and is assigned a context ID of "2", and routing table 108C stores routes described as "Context C" and is assigned a context ID of "3".

Network element 102B also implements this embodiment and includes operating system 104B and BGP process 106B, which executes on top of the operating system. BGP process 106B maintains a set of routing tables, examples of which are routing tables 108D, 108E, and 108F. As depicted in FIG. 1, routing table 108D stores routes described as "Context B" and is assigned a context ID of "1". Similarly, routing table 108E stores routes described as "Context C" and is assigned a context ID of "2", and routing table 108F stores routes described as "Context D" and is assigned a context ID of "3". The values of the context descriptions and context identifiers in FIG. 1 that describe and identify routing tables in network elements 102A and 102B are used for illustrative purposes only, and any set or types of values may be used instead.

During the initial set up of a BGP session between them, network elements 102A and 102B advertise their respective context descriptions and context identifiers, and negotiate for which routing tables they can exchange routes. As illustrated in FIG. 1, network element 102A can exchange routes from its routing table 108B with routing table 108D in network element 102B, because the context description of routing table 108B matches the context description of routing table 108D. Similarly, network element 102A can exchange routes from its routing table 108C with routing table 108E in network element 102B, because the context description of routing table 108C matches the context description of routing table 108E. Routes from routing table 108A in network element 102A and from routing table 108F in network element 102B cannot be exchanged during the BGP session, because network element 102A does not maintain routes described as "Context D" and network element 102B does not maintain routes described as "Context A".

Once network elements 102A and 102B have negotiated the routing tables for which they can exchange routes, they can exchange and update routes by assembling and sending BGP UPDATE messages that are tagged with the context identifier of the desired routing table.

FIG. 2 is a block diagram that illustrates the relations between BGP contexts defined on network elements 102A and 102B according to an embodiment. Network elements 102A and 102B may exchange BGP UPDATE messages in order to update routes represented by the defined and advertised contexts.

As depicted in FIG. 2, BGP Context Relation 202A illustrates the relation established between routes described as "Context B" that are defined on network elements 102A and 102B. When network element 102A wants to send route updates of "Context B" to network element 102B, it assembles a BGP UPDATE message and tags it with a context identifier of "1", because, as shown in BGP Context Relation 202A, network element 102B has advertised that its Context ID "1" represents routes described as "Context B". Upon receiving the BGP UPDATE message, network element 102B extracts the context identifier from the message, and since the context identifier is "1" network element 102B knows that the route updates in the message must be applied to routing table 108D that stores routes described as "Context B".

Similarly, when network element 102B wants to send route updates of "Context B" to network element 102A, it assembles a BGP UPDATE message and tags it with a context identifier of "2", because, as shown in BGP Context Relation 202A, network element 102A has advertised that its Context ID "2" represents routes described as "Context B". Upon receiving the BGP UPDATE message, network element 102A extracts the context identifier from the message, and since the context identifier is "2" network element 102A knows that the route updates in the message must be applied to routing table 108B that stores routes described as "Context B".

BGP Context Relation 202B illustrates the relation established between routes described as "Context C" that are defined on network elements 102A and 102B. Analogously to exchanging routes described as "Context B", in order to exchange routes described as "Context C" and advertised as shown in BGP Context Relation 202B, network element 102A tags BGP UPDATE messages to network element 102B with a context identifier of "2", and network element 102B tags BGP UPDATE messages to network element 102A with a context identifier of "3".

4.2 Process of Context-Based Next-Hop Routing

In one embodiment, a BGP UPDATE message is used to update a route for which the next hop in the path is an address in a network that only supports network addresses of a different address family. In this embodiment, a BGP host receives a BGP UPDATE message to update a particular route, where the message includes a NEXT_HOP PATH attribute. The value of the NEXT_HOP attribute includes an address prefix that is stored in a routing table represented by a second context that is different than the context for which the message is intended. The BGP UPDATE message also includes a CONTEXT PATH attribute, the value of which associates the NEXT_HOP PATH attribute with the context identifier of the different context. The BGP host then updates the route according to the information in the BGP UPDATE message, and stores the address prefix from the NEXT_HOP attribute in the routing table represented by the second context. Subsequently, when the BGP host receives a packet that must be routed according to the particular route, the BGP host locates the address prefix in the routing table represented by the second context, and routes the packet accordingly.

For example, a BGP host stores its IPv4 and IPv6 routes in separate routing tables, where each routing table is represented by a different context. The BGP host receives a BGP UPDATE message to update a particular route having IPv4 unicast address prefixes. A NEXT_HOP attribute that is included in the message, however, stores an IPv6 address prefix, thus indicating that the next hop in the route is an IPv6 network. The BGP UPDATE message also includes a CON- TEXT attribute, the value of which associates the NEXT_HOP attribute with the IPv6 context. The BGP host updates the route according to the information in the BGP UPDATE message. Further, based on the information in the CONTEXT attribute, the BGP host knows that it needs to store the IPv6 address in the NEXT_HOP attribute in the routing table that is represented by the IPv6 context. Subsequently, whenever the BGP host receives a packet that needs to be routed along the particular route, the BGP host locates the address prefix of the next hop in the routing table represented by the IPv6 context. Thus, this embodiment of the present invention enables routing of packets from an IPv4 network to an IPv6 network that does not support IPv4 addressing.

The above example of using the NEXT_HOP attribute in conjunction with a CONTEXT attribute to route packets is to be viewed in illustrative rather than restrictive sense. The technique described above can be implemented by a BGP host to route packets along any routes in which the address prefixes are stored in routing tables represented by different contexts. Besides IPv4 and IPv6, such routes may include VPN routes, as well as routes for carrying a specific type of information for which the address prefixes belong to the same address family (such as, for example, routes for carrying video, audio, and data in an IPv4 unicast network).

5.0 Context Capability Approach for Advertising and Updating Contexts

Currently the BGP protocol can carry prefix information for multiple address families and subsequence address families using the Multiprotocol Extension defined in IETF RFC2858, but this approach is limited to destination tables that fit the AFI/SAFI hierarchy. The approach of this section provides a way to exchange prefix information for specific contexts in a way that can be used without having to ensure that every context that is advertised is necessarily a specific context that is defined by an AFI and/or SAFI. Prior approaches fail to provide a solution for multi-topology routing (MTR), inter-domain QOS routing, or any other service that is not represented as an AFI and/or SAFI.

Destination tables for BGP updates have been discussed in the "ietf-idr-bgp4" series of IETF internet-draft documents. An example of such document is "draft-ietf-idr-bgp4-26.txt", which was published by IETF in October 2004. Originally, BGP updates approaches targeted the global IPv4 unicast table. Then came the BGP Multiprotocol Extension of RFC2858, which allowed addressing different address families based on known Address Family and Subsequent Address Family identifiers. With this approach, information such as IPv4 multicast reverse path information could be propagated to network routers through BGP. The Multiprotocol Extension based its design on a way to address special target tables based on the usage of these tables, but left little room available to extend the original concept with other types of table separation.

The approach herein defines a context communication capability that can be used instead of, or in combination with, the Multiprotocol Extension addressing scheme. The approach describes a CONTEXT Capability in which each destination context is described using type codes and values, and is associated with a context identifier. When two BGP speakers have exchanged their context descriptions, a prefix exchange can happen, using a special CONTEXT AFI and using the context identifier in place of the SAFI value.

With this approach, the existing update message format can be reused, with the added benefit of being able to define contexts without having to force context definitions into the two level AFI/SAFI hierarchy. The approach also allows for backward compatibility with existing BGP extensions, such as Route Refresh (as defined in WETF RFC2918 that was published in September 2000) and others.

In this approach, BGP peers in a BGP session advertise their capability to exchange reachability information for individual contexts by using a CAPABILITIES parameter as defined in RFC3392, which was published by IETF in November 2002. The CAPABILITIES parameter is associated with the CONTEXT Capability and includes a Capability Code, Capability Length, and Capability Value fields. The Capability Code unambiguously identifies a particular capability. The Capability Length contains the length of the Capability Value field. The Capability Value field is a variable length field that carries information that is specific to the capability defined in the Capability Code field.

In the approach described herein, the capability to exchange reachability information for individual contexts is associated with a CONTEXT Address Family, and is identified by a CONTEXT AFI value. In one embodiment, the CONTEXT AFI value is defined and maintained by IANA. In different embodiments, the CONTEXT AFI may be a value that is not provided or defined for use by the public, but is nevertheless used by BGP peers in a private autonomous system. In advertising a CONTEXT Capability, a BGP host includes the CONTEXT AFI value in the Capability Code field of a CAPABILITIES parameter to signal to its BGP peer that the BGP host supports reachability information for contexts. The BGP host then includes in the Capability Value field of the CAPABILITIES parameter information that describes one or more particular contexts.

In this approach, the information that describes a context and that is included in the Capability Value field of a CAPABILITIES parameter comprises a Context Identifier and a Context Description associated with each particular context that is being advertised. For example, FIG. 6 is a block diagram that illustrates the format of a BGP CONTEXT Capability Value field.

Figure 6:
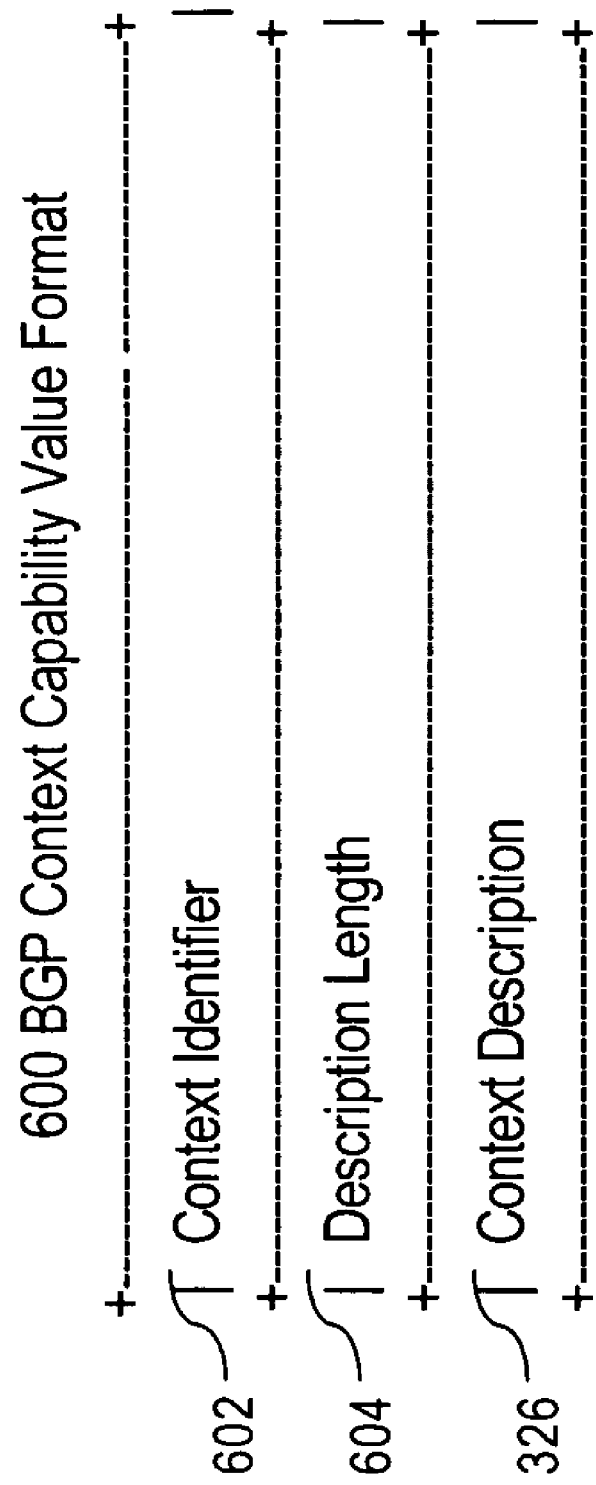
FIG. 6 is a block diagram that illustrates the format of a BGP CONTEXT Capability Value field.

In FIG. 6, BGP Context Capability Value field 600 includes Context Identifier 602, Description Length 604, and Context Description 326. Context Identifier 602 is associated with a particular context of the BGP host that sends the CAPABILITIES parameter advertising the Context Capability, and uniquely identifies the particular context in the BGP host. Description Length 604 contains the length of the Context Description field.

In one embodiment, the format of Context Description field 326 is according to the format illustrated in FIG. 3C. The value in Context Description field 326 describes the context with which a context identifier is associated. The Context Description comprises a list of one or more triplets <Type, Length, Value>, where each triplet describes a particular context. In each triplet, the type field indicates how a receiver should interpret the value field. A context is said to be matching if, and only if, all triplets match.

According to one embodiment, in a triplet included in the Context Description field, the Type field is one octet in size, the Length field is one octet and specifies a length of the Value field in octets, and the Value field has variable length. A receiver processes the contents of the Value field in different ways depending on the value of the Type field. In one embodiment, the Type field may carry any of the following values:

"0": Reserved. There may be any number of other reserved values, such as "255," etc.;

"1": Address Family Identifier (AFI). If the Type field is "1", then the Value field must contain a valid AFI value according to the address family name space maintained by IANA;

"2": Subsequent Address Family Identifier (SAFI). If the Type field is "2", then the Value field must contain a valid SAFI value according to the address family space maintained by IANA;

"3": QoS Identifier (qosid). If the Type field is "3", then the Value field must contain a two octet (16 bit) QoS identifier, which a BGP speaker uses to identify a specific table for this QoS level;

"4": Topology Identifier (topoid). If the Type field is "4", then the Value field must contain a two octet (16 bit) topology identifier value that is used by the BGP speaker to identify the topology table. Thus, a particular Type field value enables use of this approach with MTR, for example.

Other Context Description Type values may be defined and could be maintained by IANA, for example.

In operation, when a BGP host wants to exchange routes for a context that is outside the AFI/SAFI hierarchy, it can advertise the CONTEXT capability in a CAPABILITIES parameter that includes a description of one or more particular context, to its peer. Two BGP peers can exchange routing information for a particular context if both have advertised the same context. Two BGP peers are said to have advertised the same context if, and only if, all type/value pairs in a context description are exactly the same. The context identifiers advertised by each side are not significant in this comparison. A BGP host stores each received context identifier so that it can identify the context while processing received data.

When the CONTEXT capability has been exchanged and supported contexts have been negotiated, and two BGP peers want to exchange reachability information for a particular context, the BGP peers use the CONTEXT AFI to identify that an extended context is used, and provide the context identifier associated with the particular context as the SAFI value.

For example, in one embodiment, a BGP host may advertise address prefixes represented by a particular context by sending a BGP UPDATE message that is formatted according to the Multiprotocol Extension to BGP. In particular, the BGP peer includes in the message an MP_REACH_NLRI path attribute that contains the CONTEXT AFI in the AFI field of the attribute, and the context identifier of the particular context in the SAFI field of the attribute. When the BGP peer of the BGP host receives the BGP UPDATE message and identifies the CONTEXT AFI in the MP_REACH_NLRI attribute, the BGP peer uses the SAFI value to identify the previously advertised particular context.

Similarly, when the BGP host wants to withdraw routes represented by the particular context, the BGP host sends to its BGP peer a BGP UPDATE message that includes a MP_UNREACH_NLRI attribute. The MP_UNREACH_NLRI attribute contains the CONTEXT AFI in its AFI field, and the context identifier of the particular context in its SAFI field. When the BGP peer receives the message, it identifies the CONTEXT AFI, and uses the context identifier from the SAFI field to identify the particular context. Once it has identified the particular context, the BGP peer withdraws the address prefixes that are included in the NLRI field of the MP_UNREACH_NLRI attribute.

This approach for extending the available contexts beyond the current AFI/SAFI context reuses the current Multiprotocol Extension formats and therefore no changes are needed to the BGP UPDATE message format. Existing extensions that rely on the AFI/SAFI values to specify a given context can, without protocol modifications, use the CONTEXT AFI and the Context Identifier (as SAFI value) to specify the new contexts.

The approach herein could be used in any network device operating system, other network software, or a combination of such software and hardware that provides or hosts an implementation of the BGP protocol.

6.0 Implementation Mechanisms—Hardware Review

Figure 5:
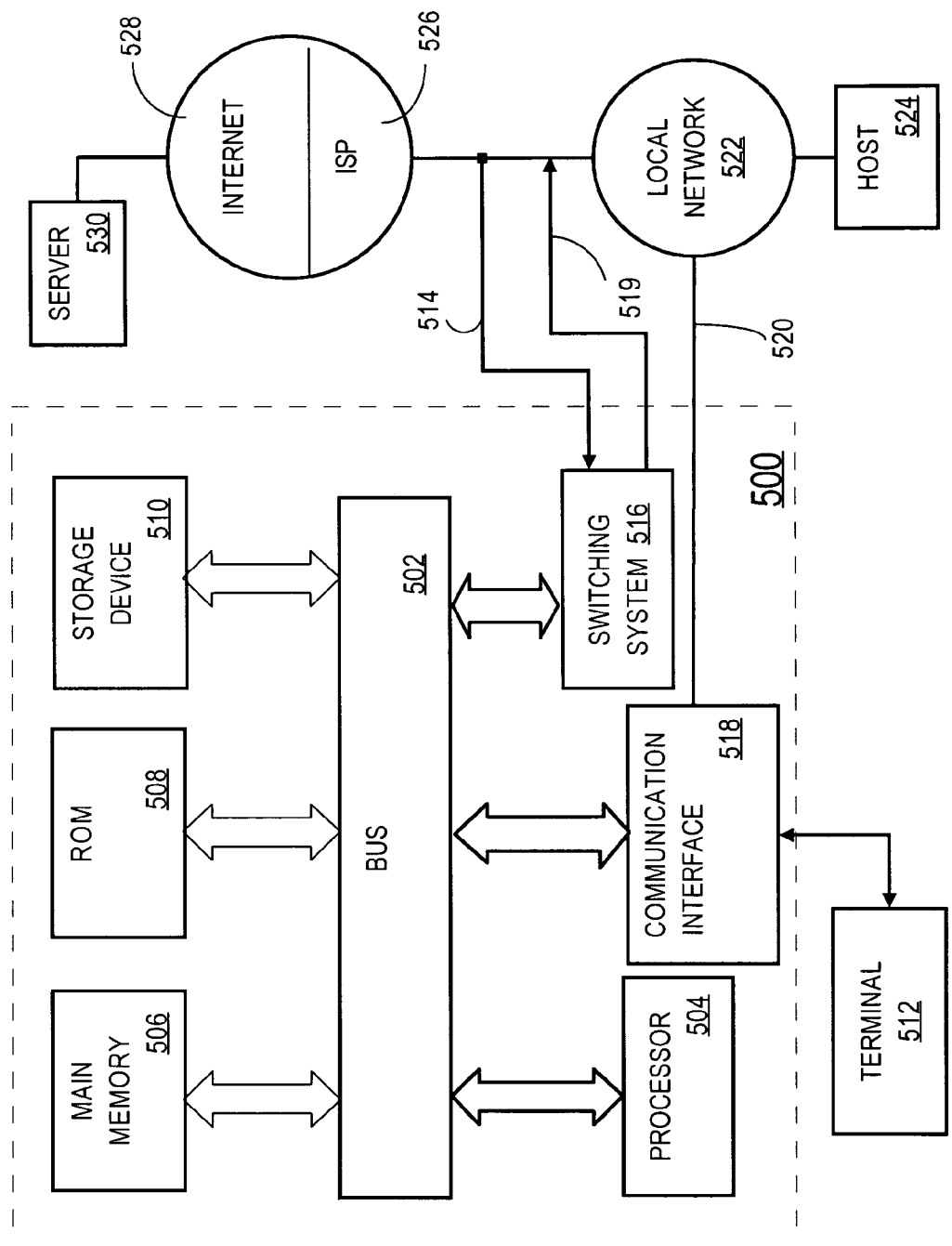
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for providing context-based routing table updates in a BGP process. According to one embodiment of the invention, context-based routing table updates in a BGP process are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for context-based routing table updates in BGP hosts as described herein.

The received code may be executed by processor 504 as it is received, and/or stored in storage device 510, or other non-volatile storage for later execution. In this manner, computer system 500 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than an a restrictive sense.

What is claimed is:

1. A method of providing routing table updates in Border Gateway Protocol (BGP) hosts, the method comprising the computer-implemented steps of:

defining one or more contexts in computer memory of a BGP host, wherein each context represents a distinct routing table;

wherein defining said one or more contexts includes associating each context of said one or more contexts with a unique context identifier and a unique context description;

as part of establishing a BGP session between said BGP host and a BGP peer, advertising a particular context of said one or more contexts to said BGP peer;

wherein advertising said particular context includes sending to said BGP peer a context identifier and a context description associated with said particular context; and in response to receiving from said BGP peer a route update message that includes information identifying said particular context, updating, at said BGP host, a particular routing table that is represented by said particular context;

wherein said information, that is included in said route update message, includes said context identifier.

2. A method as recited in claim 1, wherein:

said particular context is a first context;

said context identifier is a first context identifier; and said route update message includes a context attribute, wherein:

said context attribute is a first BGP PATH attribute, and the value of said context attribute associates a second BGP PATH attribute with a second context identifier that is associated with a second context of said one or more contexts that is different than said first context.

3. A method as recited in claim 2, wherein said second BGP PATH attribute is a NEXT_HOP attribute.

4. A method as recited in claim 3, wherein:
said particular routing table represented by said first context includes Internet Protocol version 4 (IPv4) address prefixes;
the value of said NEXT_HOP attribute includes an Internet Protocol version 6 (IPv6) address; and
said second context represents a different routing table that includes IPv6 address prefixes.

5. A method as recited in claim 4, wherein:
updating said particular routing table includes storing said IPv6 address; and
further comprising routing a network packet from an IPv4 network to an IPv6 network,
wherein routing includes locating said IPv6 address in said different routing table.

6. A method as recited in claim 1, wherein advertising said particular context includes sending said context identifier and said context description to said BGP peer in a BGP CAPABILITIES parameter that is included in a BGP OPEN message.

7. A method as recited in claim 6, wherein advertising said particular context further includes sending a CONTEXT Address Family Identifier (AFI) value which indicates that said BGP host supports processing of routes that are represented by contexts.

8. A method as recited in claim 6, wherein said route update message further includes said CONTEXT AFI value.

9. A method as recited in claim 1, wherein said route update message is a BGP UPDATE message that includes a field for storing said context identifier.

10. A method as recited in claim 1, wherein updating said particular routing table includes:
extracting the value of said context identifier from said route update message;
only if the value of said context identifier matches the value of any context identifier associated with any context in said BGP host, then extracting the rest of the information included in said route update message.

11. A method as recited in claim 1, wherein said context description comprises one of an Address Family Identifier (AFI) that identifies a type of network address, and a Subsequent Address Family Identifier (SAFI) that identifies a type of communication forwarding mechanism.

12. A method as recited in claim 1, further comprising destroying the associations between said one or more contexts and their corresponding context identifiers upon the closing of said BGP session.

13. A method as recited in claim 1, further comprising preserving the associations between said one or more contexts and their corresponding context identifiers across different BGP sessions.

14. A method as recited in claim 1, further comprising:
sending one or more route update messages to said BGP host for updating only routing tables that are represented by contexts that have been advertised by said BGP host as part of establishing said BGP session; and
wherein said route update message for updating said particular routing table is a member of said one or more route update messages.

15. A method as recited in claim 1, wherein each distinct routing table stores a set of routes having address prefixes belonging to the same address family.

16. A method as recited in claim 1, wherein each distinct routing table stores a set of routes having address prefixes belonging to different address families.

17. A method as recited in claim 1, wherein a set of routes is stored in each distinct routing table, wherein each set of routes is used for routing packets that carry a particular type of information.

18. A method as recited in claim 17, wherein said particular type of information includes at least one of video information, audio information, and data information.

19. An apparatus for providing routing table updates in Border Gateway Protocol (BGP), comprising:
means for executing a BGP process that enables said apparatus to operate as a BGP host;
means for defining one or more contexts in computer memory of said BGP host, wherein each context represents a distinct routing table;
wherein said means for defining said one or more contexts include means for associating each context of said one or more contexts with a unique context identifier and a unique context description;
means for advertising a particular context of said one or more contexts to a BGP peer, wherein said particular context is advertised as part of establishing a BGP session between said BGP host and said BGP peer;
wherein said means for advertising said particular context include means for sending to said BGP peer a context identifier and a context description associated with said particular context; and
means for updating, at said BGP host, a particular routing table that is represented by said particular context, wherein said routing table is updated in response to receiving from said BGP peer a route update message that includes information identifying said particular context;
wherein said information, that is included in said route update message, includes said context identifier.

20. A computer-readable volatile or non-volatile medium storing one or more sequences of instructions for providing routing table updates in Border Gateway Protocol (BGP) hosts, which instructions, when executed by one or more processors, cause the one or more processors to perform:
defining one or more contexts in computer memory of a BGP host, wherein each context represents a distinct routing table;
wherein defining said one or more contexts comprises associating each context of said one or more contexts with a unique context identifier and a unique context description;
as part of establishing a BGP session between said BGP host and a BGP peer, advertising a particular context of said one or more contexts to said BGP peer;
wherein advertising said particular context comprises sending to said BGP peer a context identifier and a context description associated with said particular context; and
in response to receiving from said BGP peer a route update message that includes information identifying said particular context, updating, at said BGP host, a particular routing table that is represented by said particular context;
wherein said information, that is included in said route update message, includes said context identifier.

21. A computer-readable volatile or non-volatile medium as recited in claim 20, wherein:
said particular context is a first context;
said context identifier is a first context identifier; and
said route update message includes a context attribute, wherein:
said context attribute is a first BGP PATH attribute, and the value of said context attribute associates a second BGP PATH attribute with a second context identifier that is associated with a second context of said one or more contexts that is different than said first context.

22. A computer-readable volatile or non-volatile medium as recited in claim 21, wherein said second BGP PATH attribute is a NEXT_HOP attribute.

23. A computer-readable volatile or non-volatile medium as recited in claim 22, wherein:
said particular routing table represented by said first context includes Internet Protocol version 4 (IPv4) address prefixes;
the value of said NEXT_HOP attribute includes an Internet Protocol version 6 (IPv6) address; and
said second context represents a different routing table that includes IPv6 address prefixes.

24. A computer-readable volatile or non-volatile medium as recited in claim 23, wherein:
the instructions for updating said particular routing table further comprise instructions for storing said IPv6 address; and
the computer-readable medium further comprises instructions which, when executed by the one or more processors, cause the one or more processors to perform routing a network packet from an IPv4 network to an IPv6 network, wherein the instructions for routing comprise instructions for locating said IPv6 address in said different routing table.

25. A computer-readable volatile or non-volatile medium as recited in claim 20, wherein the instructions for advertising said particular context comprise instructions for sending said context identifier and said context description to said BGP peer in a BGP CAPABILITIES parameter that is included in a BGP OPEN message.

26. A computer-readable volatile or non-volatile medium as recited in claim 25, wherein the instructions for advertising said particular context further comprise instructions for sending a CONTEXT Address Family Identifier (AFI) value which indicates that said BGP host supports processing of routes that are represented by contexts.

27. A computer-readable volatile or non-volatile medium as recited in claim 25, wherein said route update message further includes said CONTEXT AFI value.

28. A computer-readable volatile or non-volatile medium as recited in claim 20, wherein said route update message is a BGP UPDATE message that includes a field for storing said context identifier.

29. A computer-readable volatile or non-volatile medium as recited in claim 20, wherein the instructions for updating said particular routing table comprise instructions for performing:
extracting the value of said context identifier from said route update message;
only if the value of said context identifier matches the value of any context identifier associated with any context in said BGP host, then extracting the rest of the information included in said route update message.

30. A computer-readable volatile or non-volatile medium as recited in claim 20, wherein said context description comprises one of an Address Family Identifier (AFI) that identifies a type of network address, and a Subsequent Address Family Identifier (SAFI) that identifies a type of communication forwarding mechanism.

31. A computer-readable volatile or non-volatile medium as recited in claim 20, further comprising instructions which, when executed by the one or more processors, cause the one or more processors to perform destroying the associations between said one or more contexts and their corresponding context identifiers upon the closing of said BGP session.

32. A computer-readable volatile or non-volatile medium as recited in claim 20, further comprising instructions which, when executed by the one or more processors, cause the one or more processors to perform preserving the associations between said one or more contexts and their corresponding context identifiers across different BGP sessions.

33. A computer-readable volatile or non-volatile medium as recited in claim 20, further comprising instructions which, when executed by the one or more processors, cause the one or more processors to perform:
sending one or more route update messages to said BGP host for updating only routing tables that are represented by contexts that have been advertised by said BGP host as part of establishing said BGP session,
wherein said route update message for updating said particular routing table is a member of said one or more route update messages.

34. A computer-readable volatile or non-volatile medium as recited in claim 20, wherein each distinct routing table stores a set of routes having address prefixes belonging to the same address family.

35. A computer-readable volatile or non-volatile medium as recited in claim 20, wherein each distinct routing table stores a set of routes having address prefixes belonging to different address families.

36. A computer-readable volatile or non-volatile medium as recited in claim 20, wherein a set of routes is stored in each distinct routing table, wherein each set of routes is used for routing packets that carry a particular type of information.

37. A computer-readable volatile or non-volatile medium as recited in claim 36, wherein said particular type of information includes at least one of video information, audio information, and data information.

38. An apparatus for providing routing table updates in Border Gateway Protocol (BGP), comprising:
one or more processors; and
one or more stored sequences of instructions which, when executed by said one or more processors, cause said one or more processors to perform:
executing a BGP process that enables said apparatus to operate as a BGP host;
defining one or more contexts in computer memory of said BGP host, wherein each context represents a distinct routing table;
wherein defining said one or more contexts includes associating each context of said one or more contexts with a unique context identifier and a unique context description;
as part of establishing a BGP session between said BGP host and a BGP peer, advertising a particular context of said one or more contexts to said BGP peer;
wherein advertising said particular context includes sending to said BGP peer a context identifier and a context description associated with said particular context; and
in response to receiving from said BGP peer a route update message that includes information identifying said particular context, updating, at said BGP host, a particular routing table that is represented by said particular context;
wherein said information, that is included in said route update message, includes said context identifier.

39. An apparatus as recited in claim 38, wherein said apparatus is a router.

40. An apparatus as recited in claim 38, wherein:
said particular context is a first context;
said context identifier is a first context identifier; and
said route update message includes a context attribute, wherein:
  said context attribute is a first BGP PATH attribute, and
  the value of said context attribute associates a second BGP PATH attribute with a second context identifier that is associated with a second context of said one or more contexts that is different than said first context.

41. An apparatus as recited in claim 40, wherein:
said second BGP PATH attribute is a NEXT_HOP attribute;
said particular routing table represented by said first context includes Internet Protocol version 4 (IPv4) address prefixes;
the value of said NEXT_HOP attribute includes an Internet Protocol version 6 (IPv6) address; and
said second context represents a different routing table that includes IPv6 address prefixes.

42. An apparatus as recited in claim 41, wherein:
the instructions that cause said one or more processors to perform updating said particular routing table include instructions which, when executed, cause said one or more processors to perform storing said IPv6 address; and
the one or more stored sequences of instructions further comprise instructions which, when executed, cause said one or more processors to perform routing a network packet from an IPv4 network to an IPv6 network, wherein routing includes locating said IPv6 address in said different routing table.

43. An apparatus as recited in claim 38, wherein the instructions that cause said one or more processors to perform advertising said particular context include instructions which, when executed, cause said one or more processors to perform sending said context identifier and said context description to said BGP peer in a BGP CAPABILITIES parameter that is included in a BGP OPEN message.

44. An apparatus as recited in claim 43, wherein the instructions that cause said one or more processors to perform advertising said particular context further include instructions which, when executed, cause said one or more processors to perform sending a CONTEXT Address Family Identifier (AFI) value which indicates that said BGP host supports processing of routes that are represented by contexts.

45. An apparatus as recited in claim 43, wherein said route update message further includes said CONTEXT AFI value.

46. An apparatus as recited in claim 38, wherein said route update message is a BGP UPDATE message that includes a field for storing said context identifier.

47. An apparatus as recited in claim 38, wherein the instructions that cause said one or more processors to perform updating said particular routing table include instructions which, when executed, cause said one or more processors to perform:
  extracting the value of said context identifier from said route update message;
  only if the value of said context identifier matches the value of any context identifier associated with any context in said BGP host, then extracting the rest of the information included in said route update message.

48. An apparatus as recited in claim 38, wherein said context description comprises one of an Address Family Identifier (AFI) that identifies a type of network address, and a Subsequent Address Family Identifier (SAFI) that identifies a type of communication forwarding mechanism.

* * * * *